United States Patent
Iijima et al.

(10) Patent No.: US 10,965,451 B2
(45) Date of Patent: Mar. 30, 2021

(54) AUTHENTICATION METHOD, AUTHENTICATION DEVICE, AUTHENTICATION TARGET DEVICE AND IMAGE FORMING APPARATUS

(71) Applicant: CANON KABUSHIKI KAISHA, Tokyo (JP)

(72) Inventors: Ichiro Iijima, Yokohama (JP); Kenjiro Hori, Tokorozawa (JP); Hirotaka Ittogi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/661,236

(22) Filed: Oct. 23, 2019

(65) Prior Publication Data
US 2020/0136817 A1    Apr. 30, 2020

(30) Foreign Application Priority Data
Oct. 30, 2018  (JP) .............................. JP2018-204341

(51) Int. Cl.
*H04L 9/08* (2006.01)
*H04L 9/32* (2006.01)

(52) U.S. Cl.
CPC .......... *H04L 9/0844* (2013.01); *H04L 9/0861* (2013.01); *H04L 9/0894* (2013.01); *H04L 9/3242* (2013.01); *H04L 9/3271* (2013.01)

(58) Field of Classification Search
CPC ... H04L 9/0844; H04L 9/0861; H04L 9/0894; H04L 9/3242; H04L 9/3271
See application file for complete search history.

(56) References Cited

U.S. PATENT DOCUMENTS

| 2003/0233559 A1* | 12/2003 | Asano ..................... G06F 21/64 713/189 |
| 2017/0230540 A1 | 8/2017 | Sasaki |
| 2019/0116049 A1 | 4/2019 | Ittogi et al. |
| 2019/0305969 A1 | 10/2019 | Iijima et al. |

FOREIGN PATENT DOCUMENTS

| CN | 1794682 A * | 6/2006 | |
| WO | WO-0156224 A1 * | 8/2001 | ....... G11B 20/00166 |
| WO | WO-2012114452 A1 * | 8/2012 | ............ H04L 9/008 |
| WO | WO-2016039568 A1 * | 3/2016 | ............... H04L 9/32 |

* cited by examiner

Primary Examiner — Techane Gergiso
(74) Attorney, Agent, or Firm — Venable LLP (57) ABSTRACT

An authentication method includes: at a first device, selecting an original key in which a first identifier has a first value and a second identifier has a second value from m original keys and generating an authentication key based on the selected original key and the authentication identifier; at a second device, selecting an authentication key generated from the original key in which the first identifier has the first value and the second identifier has the second value from n authentication keys, generating response data based on challenge data and the authentication key, and notifying the generated response data to the first device; at the first device, generating verification data based on the challenge data and the authentication key, and authenticating the authentication target device by comparing the verification data with the response data.

34 Claims, 9 Drawing Sheets

| ORIGINAL KEY TABLE [ORIGINAL KEY TABLE ID = 1] ||
|---|---|
| AUTHENTICATION KEY TABLE ID | ORIGINAL KEY |
| 1 | ORIGINAL KEY (1, 1) |
| 2 | ORIGINAL KEY (1, 2) |
| 3 | ORIGINAL KEY (1, 3) |
| ... | ... |
| j | ORIGINAL KEY (1, j) |
| ... | ... |
| m | ORIGINAL KEY (1, m) |

207-i

| ORIGINAL KEY TABLE [ORIGINAL KEY TABLE ID = i] ||
|---|---|
| AUTHENTICATION KEY TABLE ID | ORIGINAL KEY |
| 1 | ORIGINAL KEY (i, 1) |
| 2 | ORIGINAL KEY (i, 2) |
| 3 | ORIGINAL KEY (i, 3) |
| ... | ... |
| j | ORIGINAL KEY (i, j) |
| ... | ... |
| m | ORIGINAL KEY (i, m) |

207-n

| ORIGINAL KEY TABLE [ORIGINAL KEY TABLE ID = n] ||
|---|---|
| AUTHENTICATION KEY TABLE ID | ORIGINAL KEY |
| 1 | ORIGINAL KEY (n, 1) |
| 2 | ORIGINAL KEY (n, 2) |
| 3 | ORIGINAL KEY (n, 3) |
| ... | ... |
| j | ORIGINAL KEY (n, j) |
| ... | ... |
| m | ORIGINAL KEY (n, m) |

AUTHENTICATION KEY TABLE
[AUTHENTICATION KEY TABLE ID = 1]

AUTHENTICATION KEY ID = 1

| ORIGINAL KEY TABLE ID | AUTHENTICATION KEY |
|---|---|
| 1 | AUTHENTICATION KEY (1, 1, 1) |
| ... | ... |
| i | AUTHENTICATION KEY (i, 1, 1) |
| ... | ... |
| n | AUTHENTICATION KEY (n, 1, 1) |

208-j-1

AUTHENTICATION KEY TABLE
[AUTHENTICATION KEY TABLE ID = j]

AUTHENTICATION KEY ID = 1

| ORIGINAL KEY TABLE ID | AUTHENTICATION KEY |
|---|---|
| 1 | AUTHENTICATION KEY (1, j, 1) |
| ... | ... |
| i | AUTHENTICATION KEY (i, j, 1) |
| ... | ... |
| n | AUTHENTICATION KEY (n, j, 1) |

208-m-1

AUTHENTICATION KEY TABLE
[AUTHENTICATION KEY TABLE ID = m]

AUTHENTICATION KEY ID = 1

| ORIGINAL KEY TABLE ID | AUTHENTICATION KEY |
|---|---|
| 1 | AUTHENTICATION KEY (1, m, 1) |
| ... | ... |
| i | AUTHENTICATION KEY (i, m, 1) |
| ... | ... |
| n | AUTHENTICATION KEY (n, m, 1) |

208-1-k

AUTHENTICATION KEY TABLE
[AUTHENTICATION KEY TABLE ID = 1]

AUTHENTICATION KEY ID = k

| ORIGINAL KEY TABLE ID | AUTHENTICATION KEY |
|---|---|
| 1 | AUTHENTICATION KEY (1, 1, k) |
| ... | ... |
| i | AUTHENTICATION KEY (i, 1, k) |
| ... | ... |
| n | AUTHENTICATION KEY (n, 1, k) |

208-j-k

AUTHENTICATION KEY TABLE
[AUTHENTICATION KEY TABLE ID = j]

AUTHENTICATION KEY ID = k

| ORIGINAL KEY TABLE ID | AUTHENTICATION KEY |
|---|---|
| 1 | AUTHENTICATION KEY (1, j, k) |
| ... | ... |
| i | AUTHENTICATION KEY (i, j, k) |
| ... | ... |
| n | AUTHENTICATION KEY (n, j, k) |

208-m-k

AUTHENTICATION KEY TABLE
[AUTHENTICATION KEY TABLE ID = m]

AUTHENTICATION KEY ID = k

| ORIGINAL KEY TABLE ID | AUTHENTICATION KEY |
|---|---|
| 1 | AUTHENTICATION KEY (1, m, k) |
| ... | ... |
| i | AUTHENTICATION KEY (i, m, k) |
| ... | ... |
| n | AUTHENTICATION KEY (n, m, k) |

208-1-z

AUTHENTICATION KEY TABLE
[AUTHENTICATION KEY TABLE ID = 1]

AUTHENTICATION KEY ID = z

| ORIGINAL KEY TABLE ID | AUTHENTICATION KEY |
|---|---|
| 1 | AUTHENTICATION KEY (1, 1, z) |
| ... | ... |
| i | AUTHENTICATION KEY (i, 1, z) |
| ... | ... |
| n | AUTHENTICATION KEY (n, 1, z) |

208-j-z

AUTHENTICATION KEY TABLE
[AUTHENTICATION KEY TABLE ID = j]

AUTHENTICATION KEY ID = z

| ORIGINAL KEY TABLE ID | AUTHENTICATION KEY |
|---|---|
| 1 | AUTHENTICATION KEY (1, j, z) |
| ... | ... |
| i | AUTHENTICATION KEY (i, j, z) |
| ... | ... |
| n | AUTHENTICATION KEY (n, j, z) |

208-m-z

AUTHENTICATION KEY TABLE
[AUTHENTICATION KEY TABLE ID = m]

AUTHENTICATION KEY ID = z

| ORIGINAL KEY TABLE ID | AUTHENTICATION KEY |
|---|---|
| 1 | AUTHENTICATION KEY (1, m, z) |
| ... | ... |
| i | AUTHENTICATION KEY (i, m, z) |
| ... | ... |
| n | AUTHENTICATION KEY (n, m, z) |

| AUTHENTICATION KEY TABLE ID | ORIGINAL KEY TABLE ID : i | |
|---|---|---|
| | ORIGINAL KEY | PW |
| 1 | ORIGINAL KEY (i, 1) | PW(i, 1) |
| 2 | ORIGINAL KEY (i, 2) | PW(i, 2) |
| 3 | ORIGINAL KEY (i, 3) | PW(i, 3) |
| ... | ... | ... |
| j | ORIGINAL KEY (i, j) | PW(i, j) |
| ... | ... | ... |
| m | ORIGINAL KEY (i, m) | PW(i, m) |

FIG. 7B 208-j-k

| ORIGINAL KEY TABLE ID | AUTHENTICATION KEY TABLE ID : j | |
|---|---|---|
| | AUTHENTICATION KEY ID : k | |
| | AUTHENTICATION KEY | PW |
| 1 | AUTHENTICATION KEY (1, j, k) | PW(1, j) |
| 2 | AUTHENTICATION KEY (2, j, k) | PW(2, j) |
| 3 | AUTHENTICATION KEY (3, j, k) | PW(3, j) |
| ... | ... | ... |
| i | AUTHENTICATION KEY (i, j, k) | PW(i, j) |
| ... | ... | ... |
| n | AUTHENTICATION KEY (n, j, k) | PW(n, j) |

AUTHENTICATION METHOD, AUTHENTICATION DEVICE, AUTHENTICATION TARGET DEVICE AND IMAGE FORMING APPARATUS

BACKGROUND OF THE INVENTION

Field of the Invention

The present invention relates to a technique of authenticating an authentication target device by an authentication device.

Description of the Related Art

An image forming apparatus performs image formation using a consumable such as a toner. In addition, to maintain the quality of the image formed by the image forming apparatus, it is necessary to replace a replacement part that has been used for a long period of time. Further, the image forming apparatus includes an optional device whose use can be selected by the user. Here, if the consumable, replacement part, or optional device is not a genuine product, the image forming apparatus may not normally operate. As such, it is important to determine whether consumables, replacement parts, optional devices (hereinafter collectively referred to as units) implemented or mounted in an image forming apparatus are genuine products. US-2017-230540 discloses a configuration in which authentication of a unit to be mounted to the image forming apparatus is performed to verify whether the unit is a genuine product.

A challenge response authentication method may be utilized to determine whether a unit, which is an authentication target device, mounted in an image forming apparatus, which is an authentication device, is a genuine product. Specifically, the authentication device generates random number data (challenge data) and transmits the random number data to the authentication target device. The authentication target device encrypts the challenge data with a common key and transmits the encrypted challenge data as a response data back to the authentication device. The authentication device authenticates the authentication target device on the basis of whether the received response data and verification data obtained by encrypting the challenge data with the common key match each other. Since the challenge response authentication method assumes that the common keys retained in the authentication device and the authentication target device are identical to each other, it is important to prevent leakage of the common keys. For this reason, a highly secure tamperproof chip such as a security LSI is provided in the authentication device and the authentication target device, and common keys are stored in the tamperproof chips. However, if the common key is analyzed in the authentication device and/or the authentication target device, it is possible to produce a unit that can be successfully authenticated by the authentication device.

SUMMARY OF THE INVENTION

According to an aspect of the present invention, an authentication method performed by a first device configured to retain, among n×m original keys identified by combinations of n first identifiers (n is an integer of 2 or greater) having different values and m second identifiers (m is an integer of 2 or greater) having different values, m original keys in which values of first identifiers are a same first value, and a second device configured to retain an authentication identifier and retain n authentication keys generated based on the authentication identifier and each of n original keys in which values of the second identifiers are a same second value among the n×m original keys, includes: selecting, at the first device, an original key in which the first identifier has the first value and the second identifier has the second value based on the second value acquired from the second device, from the m original keys and generating, at the first device, an authentication key based on the selected original key and the authentication identifier acquired from the second device; selecting, at the second device, an authentication key generated from the original key in which the first identifier has the first value and the second identifier has the second value based on the first value acquired from the first device, from the n authentication keys; generating, at an authentication target device that is one of the first device and the second device, response data based on challenge data acquired from an authentication device that is the other of the first device and the second device and the authentication key generated or selected by the authentication target device, and notifying, by the authentication target device, the generated response data to the authentication device; generating, at the authentication device, verification data based on the challenge data and the authentication key generated or selected by the authentication device; and authenticating, at the authentication device, the authentication target device by comparing the verification data with the response data.

Further features of the present invention will become apparent from the following description of exemplary embodiments with reference to the attached drawings.

DESCRIPTION OF THE EMBODIMENTS

In the following, an exemplary embodiment of the present invention will be described with reference to the drawings. Note that the following embodiment is merely an example, and the present invention is not limited to details of the embodiment. Further, in the drawings described below, components that are not necessary for the description of the embodiment are omitted from the drawings.

First Embodiment

Figure 1:
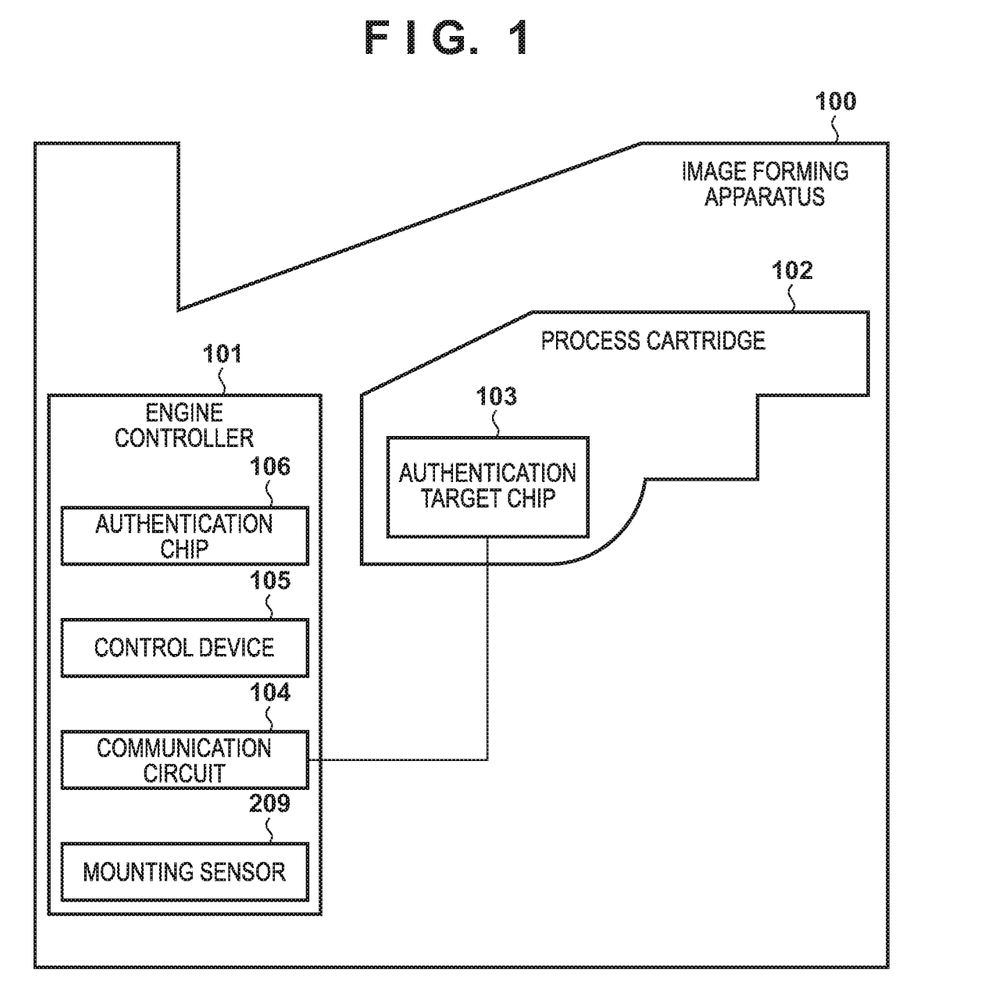
FIG. 1 is a configuration diagram of an image forming apparatus according to one embodiment.

FIG. 1 illustrates an image forming apparatus 100 that uses an authentication system according to the present embodiment. The image forming apparatus 100 is, for example, a printer, a copying machine, and a composite machine, and forms an image on a sheet in accordance with an electrophotographic process. A process cartridge 102 is a unit (replacement part) that is detachable from the main body of the image forming apparatus 100. The process cartridge 102 includes, for example, a photosensitive member and at least one member required for forming a toner image on the photosensitive member. Under control of an engine controller 101, the process cartridge 102 performs a part of a process of forming an image on the sheet. The process cartridge 102 includes an authentication target chip 103. The authentication target chip 103 is a tamperproof chip.

The engine controller 101 includes a control device 105, an authentication chip 106, a communication circuit 104 and a mounting sensor 209. The control device 105 is a controller that comprehensively controls the entire image forming apparatus 100. The authentication chip 106 is a tamperproof chip and authenticates the authentication target chip 103. The communication circuit 104 communicates with the process cartridge 102. The mounting sensor 209 detects mounting of the process cartridge 102 to the main body of the image forming apparatus 100. When the mounting sensor 209 detects mounting of the process cartridge 102, the control device 105 starts an authentication process. In the authentication process, the authentication chip 106 generates challenge data and transmits the challenge data to the control device 105. The control device 105 transmits the challenge data generated by the authentication chip 106 to the authentication target chip 103. Upon receiving response data from the authentication target chip 103 as a response to the challenge data, the control device 105 transfers the response data to the authentication chip 106. The authentication chip 106 authenticates the authentication target chip 103 on the basis of the received response data and transmits the authentication result to the control device 105.

Figure 2:
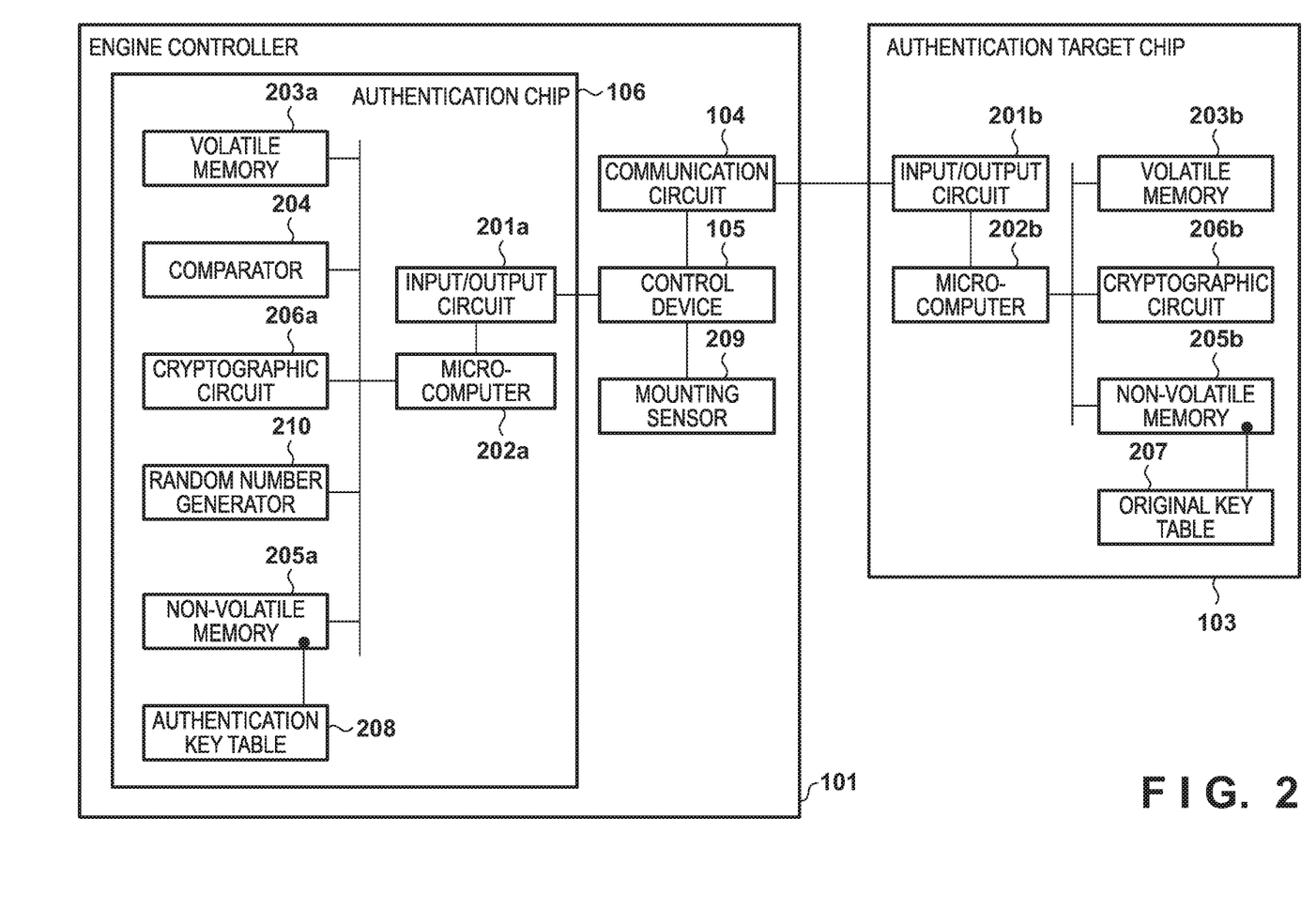
FIG. 2 is a configuration diagram of an authentication chip and an authentication target chip according to one embodiment.

FIG. 2 is a configuration diagram of the authentication chip 106 and the authentication target chip 103. An input/output circuit 201a of the authentication chip 106 relays data that is transmitted and received between the control device 105 and a microcomputer 202a. The microcomputer 202a executes a required process in accordance with a command from the control device 105. At this time, the microcomputer 202a stores data required for the process in a volatile memory 203a. A non-volatile memory 205a stores a control program for the authentication chip 106 and an authentication key table 208. A random number generator 210 generates challenge data that is random numbers in accordance with an instruction from the microcomputer 202a. A cryptographic circuit 206a executes a calculation for an authentication process in accordance with an instruction from the microcomputer 202a. A comparator 204 determines whether two pieces of input data match each other.

The image forming apparatus 100 is configured such that, when the process cartridge 102 is mounted to the main body of the image forming apparatus 100, an input/output circuit 201b of the authentication target chip 103 and the communication circuit 104 of the engine controller 101 are electrically connected. The input/output circuit 201b relays data that is transmitted and received between the control device 105 and a microcomputer 202b. The microcomputer 202b executes a required process in accordance with a command from the control device 105. At this time, the microcomputer 202b stores data required for the process in a volatile memory 203b. A non-volatile memory 205b stores a control program for the authentication target chip 103 and an original key table 207. A cryptographic circuit 206b executes a calculation for an authentication process in accordance with a command from the microcomputer 202b. Note that the cryptographic circuit 206a and the cryptographic circuit 206b execute cryptographic calculations in accordance with the same algorithm.

Figure 3A:
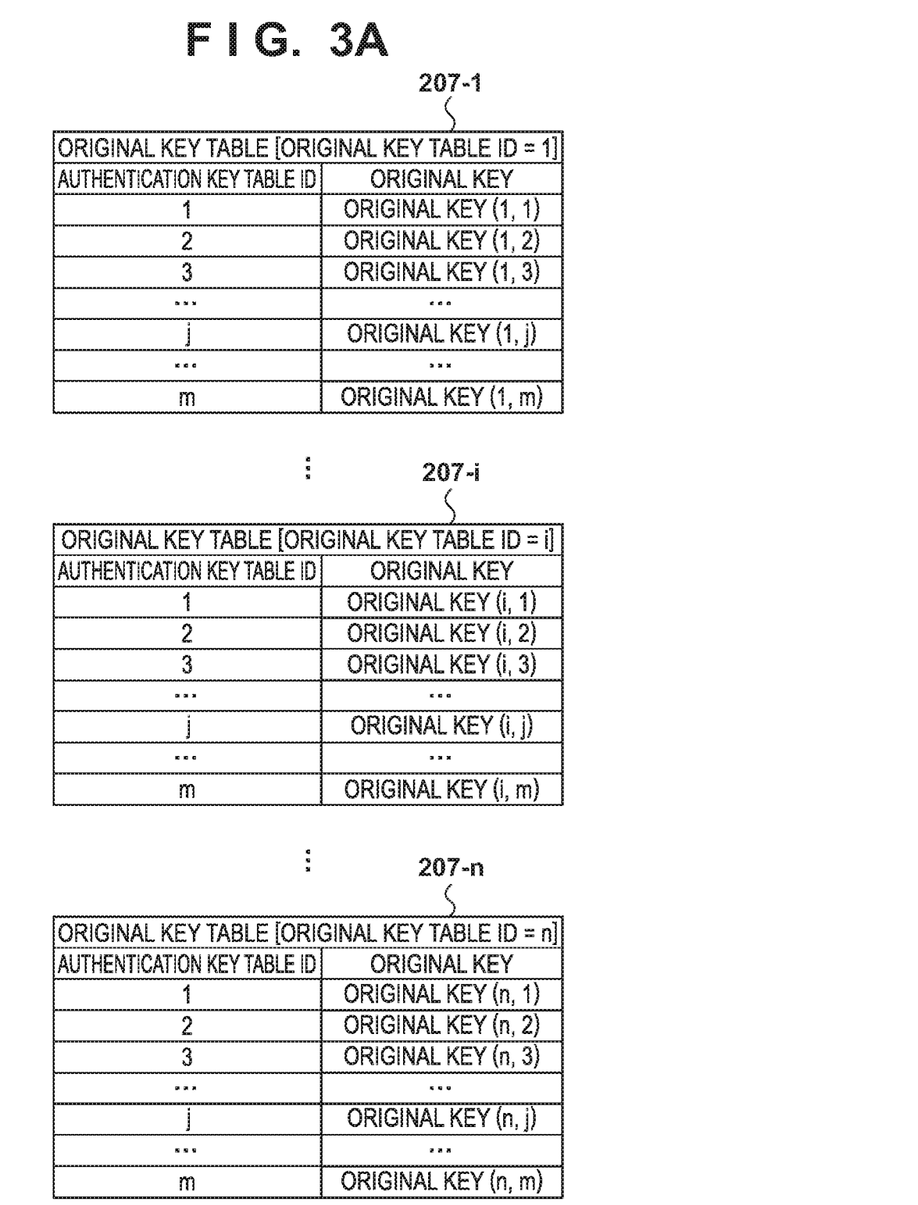
FIG. 3A is a diagram illustrating an original key table according to one embodiment.
Figure 3B:
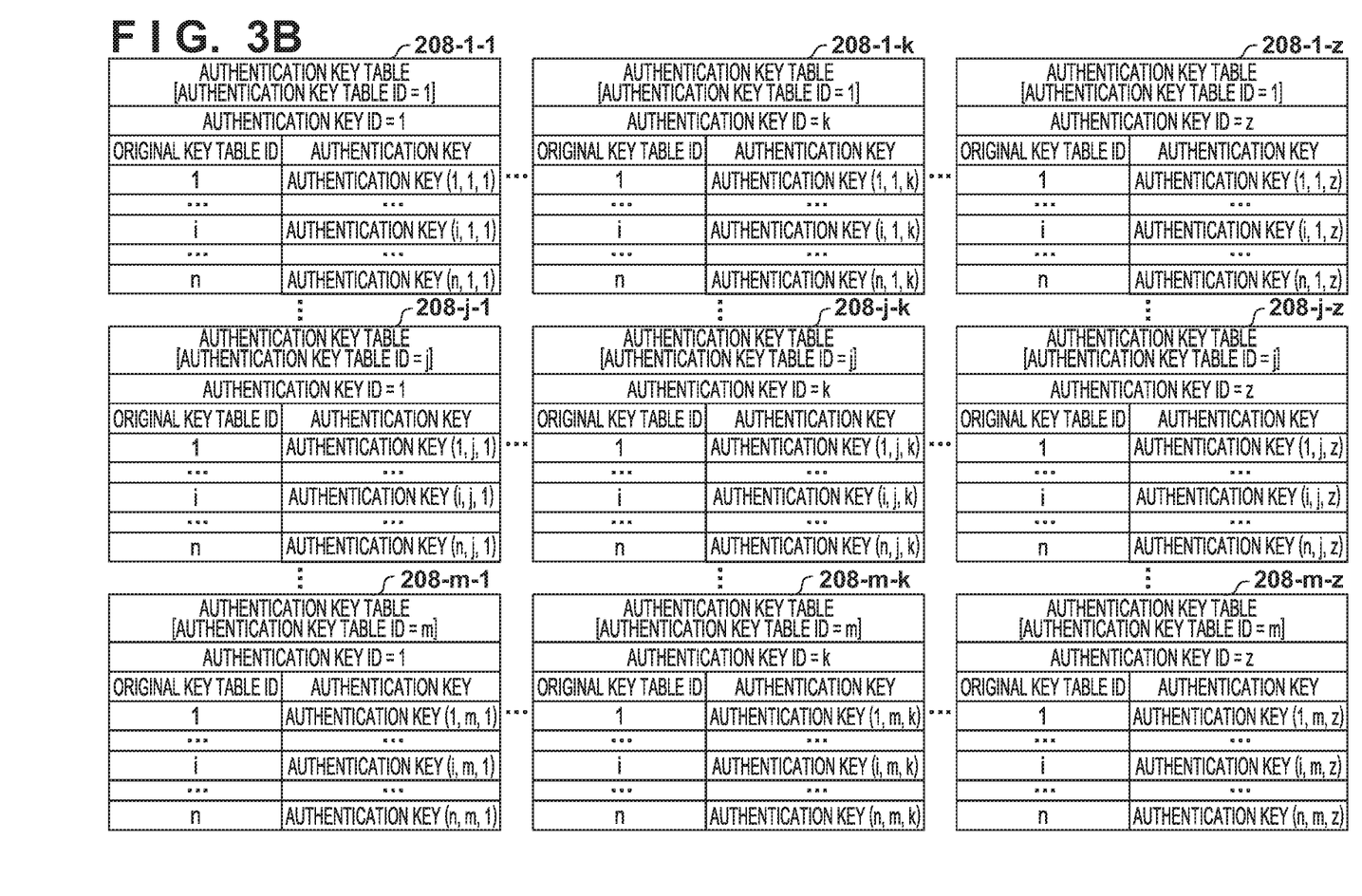
FIG. 3B illustrates an authentication key table according to one embodiment.

As illustrated in FIG. 3A, n (n is an integer of 2 or greater) original key tables, 207-1 to 207-$n$, are created in advance in the present embodiment. Then, one of the original key tables 207-1 to 207-$n$ is stored as the original key table 207 in the non-volatile memory 205b of the authentication target chip 103. In addition, as illustrated in FIG. 3B, m×z (m is an integer of 2 or greater and z is an integer of 1 or greater) authentication key tables, 208-1-1 to 208-$m$-$z$, are created in advance in the present embodiment. Then, one of the authentication key tables 208-1-1 to 208-$m$-$z$ is stored as the authentication key table 208 in the non-volatile memory 205a of the authentication chip 106. Note that a first identifier (original key table ID) is given to each of the original key tables. In the present embodiment, the original key table ID of the original key tables 207-$i$ (i is an integer from 1 to n) is set as i. In addition, two identifiers, a second identifier and an authentication identifier (an authentication key table ID and an authentication key ID), are given to each authentication key table. In the present embodiment, the authentication key table ID and the authentication key ID of the authentication key table 208-$j$-$k$ (j is an integer from 1 to m, and k is an integer from 1 to z) are set as j and k, respectively.

As illustrated in FIG. 3A, each original key table includes m—which is equal to the number of the authentication key table IDs—original keys, and each original key is associated with the authentication key table ID. In the following, in the m original keys of the original key table 207-$i$ (original key table ID=i), the original key associated with the authentication key table ID=j is referred to as an original key (i, j). In addition, as illustrated in FIG. 3B, each authentication key table includes n—which is equal to the number of the original key tables 207—authentication keys, and each authentication key is associated with the original key table ID. Here, each authentication key is generated from the original key and the authentication key ID as described later. In the following, in the n authentication keys of the authentication key table 208-$j$-$k$ (the authentication key table ID=j, and the authentication key ID=k), the authentication key associated with the original key table ID=i is referred to as an authentication key (i, j, k).

Figure 4:
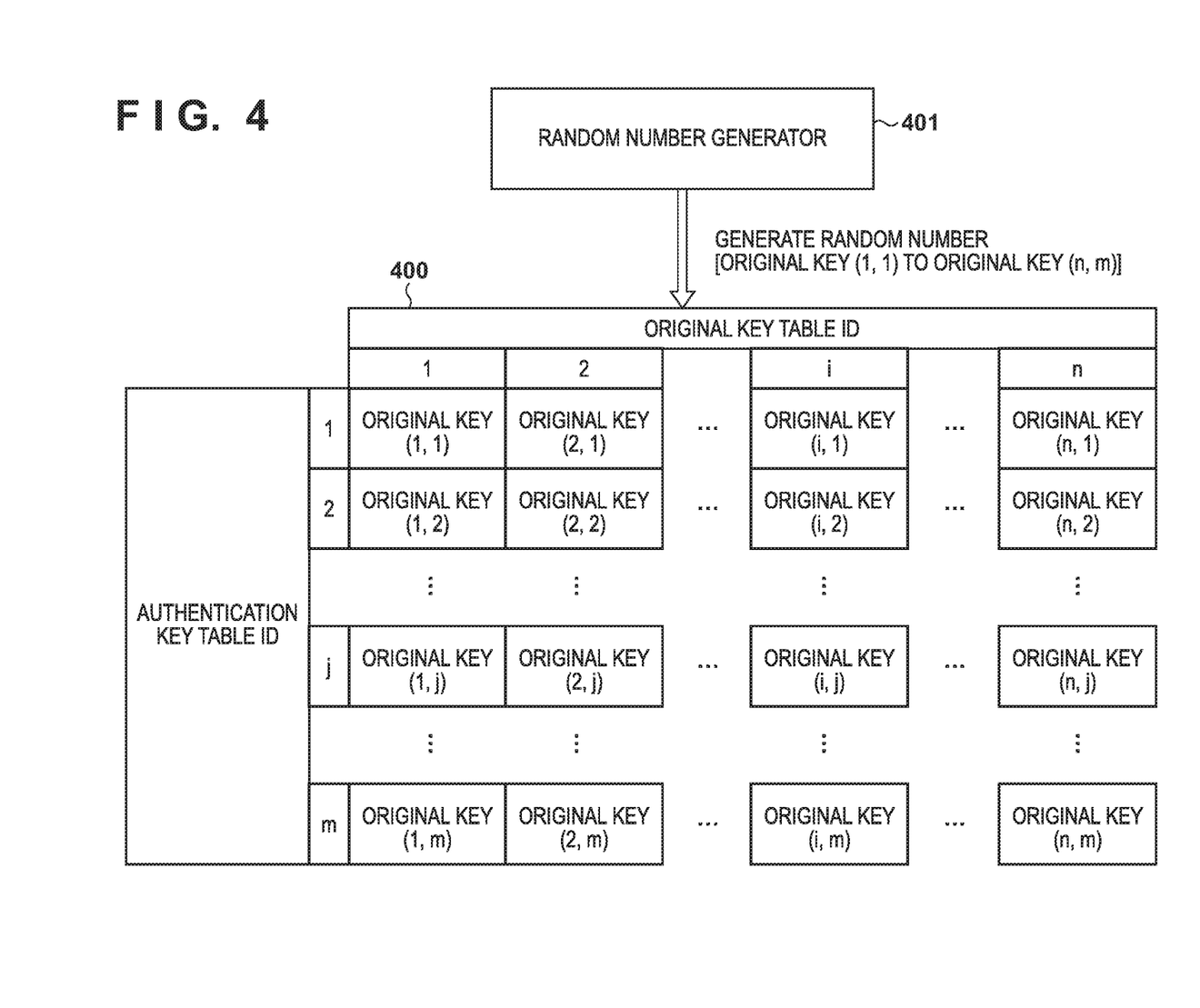
FIG. 4 illustrates an original key matrix according to one embodiment.
Figure 5:
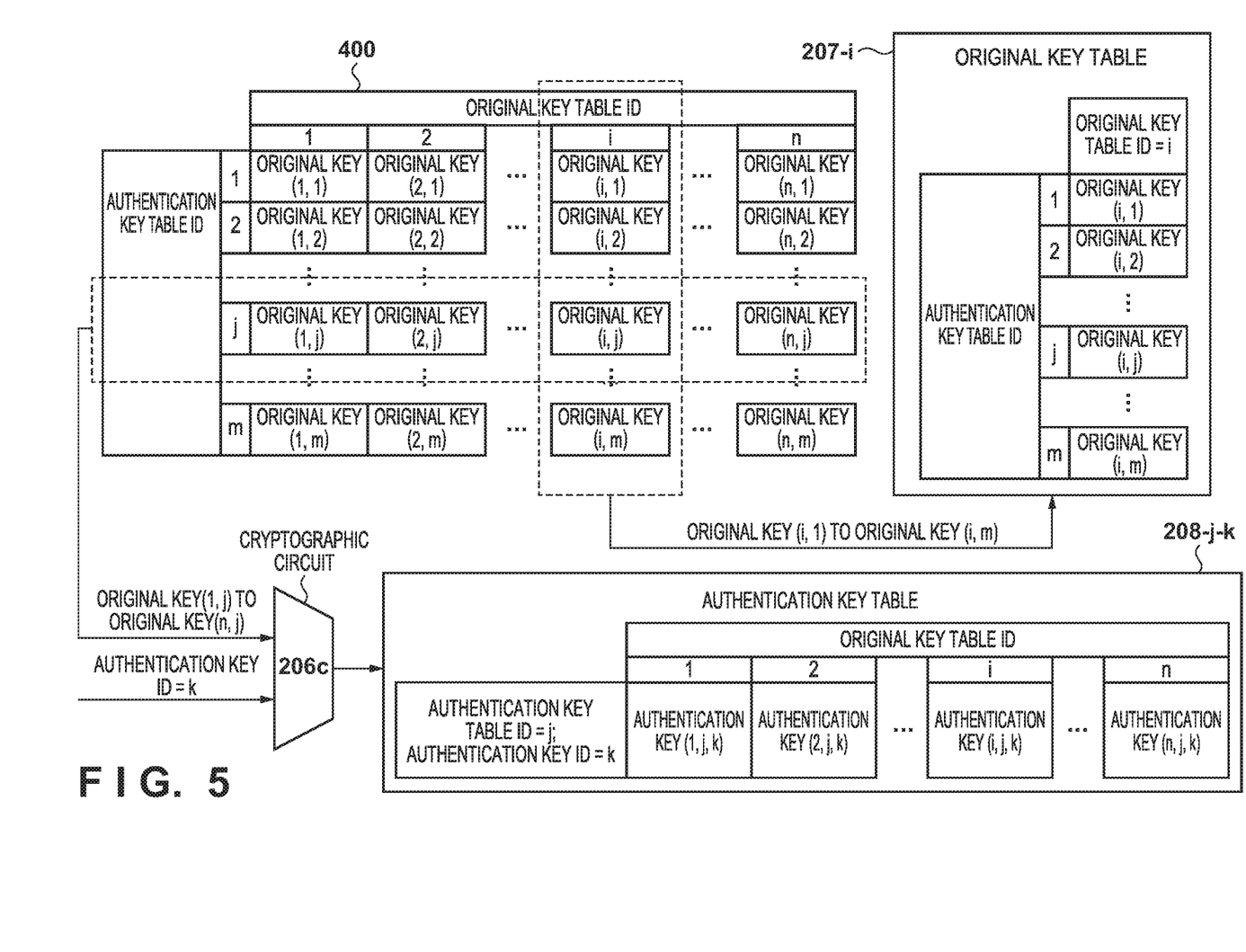
FIG. 5 illustrates a method of generating an original key table and an authentication key table according to one embodiment.

Next, a method of generating the original key table and the authentication key table are described with reference to FIG. 4 and FIG. 5. First, as illustrated in FIG. 4, an external random number generator 401 randomly generates n×m original keys and associates each key of the generated n×m original keys with each element of an original key matrix 400, which is a matrix with m rows and n columns. As illustrated in FIG. 4, original key table IDs from 1 to n are given to respective columns, authentication key table IDs from 1 to m are given to respective rows, and thus, the element in the ith column and jth row is set as an original key (i, j). Thus, each of the n×m original keys is identified by a combination of the original key table ID and the authentication key table ID. Then, as illustrated in FIG. 5, one column is set as one original key table. In other words, the m original keys to which the same original key table ID is given are set as one original key table. For example, the ith row is set as the original key table 207-*i*. In addition, an external cryptographic circuit 206*c* performs a cryptographic operation with the authentication key ID=k on each of the n original keys (1, j) to (n, j) in one row, and the calculation results are set as an authentication key (1, j, k) to an authentication key (n, j, k). Thus, the authentication key table 208-*j*-*k* is generated. In other words, on the basis of each of the n keys to which the same authentication key table ID is given and one authentication key ID, one authentication key table including n authentication keys is generated. Note that the cryptographic circuit 206*c* performs the same cryptographic operation as that performed by the cryptographic circuit 206*b* provided in the authentication target chip 103.

The cryptographic circuit 206*c* computes the authentication key by using, for example, a common key cryptographic function and/or a cryptographic hash function that is a one-way function. As the cryptographic hash function, for example, SHA-256 specified in NIST_FIPS_PUB 180-4 can be used. In this case, the authentication key (i, j, k) is determined by the following Equation (1).

$$\text{Authentication key } (i, j, k) = \text{SHA-256 (original key } (i, j)|k) \quad (1)$$

Note that, in Equation (1), the "original key (i, j)|k" means a value obtained by concatenating or combining the original key (i, j) and the original key ID k. In other words, "|" is a concatenation operator. In addition, SHA-256 ( ) is a cryptographic hash function specified in NIST_FIPS_PUB 180-4. Accordingly, in this case, the authentication key is a cryptographic hash value.

As the common key cryptographic function, AES specified in NIST_FIPS_PUB 197 may be used, for example. In this case, the authentication key (i, j, k) is determined by encrypting the value of k that is the authentication key ID with the original key ID (i, j) as the common key. Accordingly, in this case, the authentication key is cryptographic data.

One of the original key tables 207-1 to 207-*n* generated in the above-described manner is stored in the non-volatile memory 205*b* of the authentication target chip 103 during the production process of the process cartridge 102. In addition, one of the authentication key tables 208-1-1 to 208-*m*-*z* generated in the above-described manner is stored in the non-volatile memory 205*a* of the authentication chip 106 during the production process of the engine controller 101.

Figure 6:
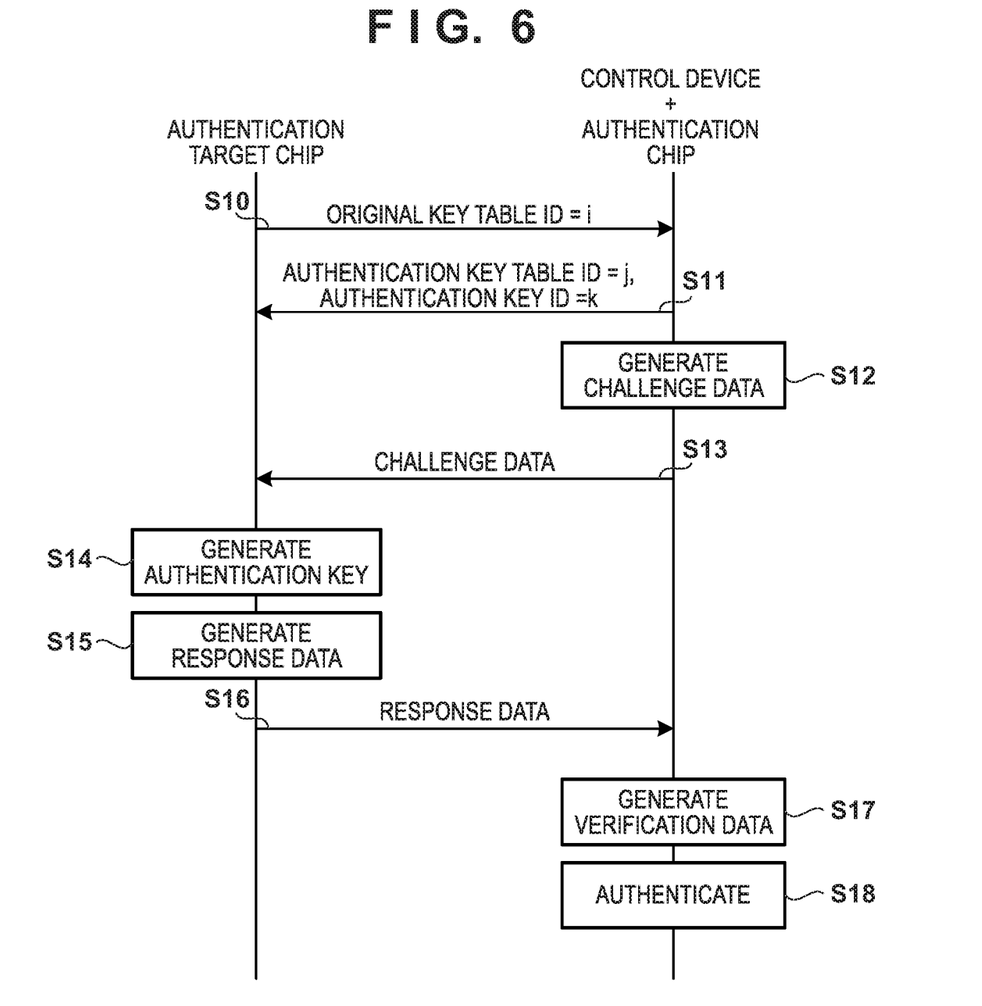
FIG. 6 illustrates a sequence of an authentication process according to one embodiment.

FIG. 6 illustrates a sequence of an authentication process according to the present embodiment. The authentication process is started when the process cartridge 102 is electrically connected to the main body of the image forming apparatus 100 and accordingly the control device 105 transmits an authentication command to the authentication target chip 103. Note that the trigger for transmission of the authentication command to the authentication target chip 103 by the control device 105 is not limited to mounting of the process cartridge 102 to the image forming apparatus 100. For example, the authentication command transmission may be triggered when the user provides an instruction of executing an authentication of the process cartridge 102 to the image forming apparatus 100. Note that, in the following description, the original key table 207-*i* is stored in the non-volatile memory 205*b* of the authentication target chip 103, and the authentication key table 208-*j*-*k* is stored in the non-volatile memory 205*a* of the authentication chip 106.

At S10, the microcomputer 202*b* of the authentication target chip 103 transmits, to the control device 105, the original key table ID (i in this example) of the original key table 207-*i* stored in the non-volatile memory 205*b*. At S11, the control device 105 acquires the authentication key table ID (j in this example) and the authentication key ID (k in this example) of the authentication key table 208-*j*-*k* stored in the non-volatile memory 205*a*, and transmits the IDs to the authentication target chip 103. At S12, the random number generator 210 of the authentication chip 106 randomly generates challenge data. At S13, the control device 105 acquires the challenge data from the random number generator 210 and transmits the data to the authentication target chip 103.

At S14, the microcomputer 202*b* causes the cryptographic circuit 206*b* to generate an authentication key (i, j, k) with the authentication key ID=k notified at S11 and the original key (i, j) corresponding to the authentication key table ID notified at S11 among the m original keys of the original key table 207-*i* as inputs of the cryptographic circuit 206*b*. At S15, the microcomputer 202*b* of the authentication target chip 103 provides the challenge data received at S13 and the authentication key (i, j, k) generated at S14 to the cryptographic circuit 206*b* to cause the cryptographic circuit 206*b* to generate response data.

In the case where the cryptographic circuit 206*b* utilizes SHA-256, the response data is generated by the following equation.

$$\text{Response data} = \text{SHA-256 (authentication key } (i, j, k)|\text{challenge data})$$

In addition, in the case where the cryptographic circuit 206*b* utilizes AES, the response data is generated by encrypting the challenge data with the authentication key (i, j, k). At S16, the microcomputer 202*b* of the authentication target chip 103 transmits the response data to the authentication chip 106.

At S17, the microcomputer 202*a* selects the authentication key (i, j, k) corresponding to the original key table ID notified at S10 from the n authentication keys of the authentication key table 208-*j*-*k*. Then, with the selected authentication key (i, j, k) and the challenge data generated at S13 as inputs of the cryptographic circuit 206*a*, the cryptographic circuit 206*a* is caused to generate verification data. Note that the method of generating verification data is the same as the method of generating response data at S15. Accordingly, when the authentication target chip 103 (process cartridge 102) is legitimate, the verification data and the response data are identical to each other. The microcomputer 202*a* inputs the verification data generated at S17 and the response data received at S16 to the comparator 204 and acquires a result of a determination whether the verification data and the response data match each other, from the comparator 204. Then, the microcomputer 202*a* notifies the control device 105 of an authentication success when the verification data and the response data match each other, whereas the microcomputer 202*a* notifies the control device 105 of an authentication failure when the verification data and the response data do not match each other.

When the authentication has failed, the control device 105 holds the image forming process and indicates a display for leaving the determination whether to permit the image formation to the user on a display unit (not illustrated) of the image forming apparatus. When the authentication result is an authentication success, the control device 105 permits the image forming apparatus 100 to perform image formation.

Note that, in the present embodiment, the same cryptographic circuit is used for the generation of the authentication key and the generation of the response data (verification data). However, it is also possible to use different cryptographic circuits for the generation of the authentication key and the generation of the response data (verification data). For example, SHA-256 may be used for the authentication key, and AES may be used for generation of the response data and the verification data. Conversely, AES may be used for the authentication key, and SHA-256 may be used for the generation of the response data and the verification data. Note that the order in the sequence of FIG. 6 is merely an example, and the present invention is not limited to the order illustrated in FIG. 6. For example, the order of S10 and S11 may be reversed. When receiving the authentication key table ID and the authentication key ID from the authentication chip 106, the authentication target chip 103 may generate the authentication key at any time until it generates response data. In addition, the authentication chip 106 may generate verification data prior to reception of response data.

For example, imagine a case where an attacker has analyzed the original key table 207 stored in the non-volatile memory 205b and has successfully decrypted one original key (X1, X2). In this case, the attacker can only produce an authentication target chip that can successfully perform authentication only in the authentication chip 106 having the authentication key table 208-X2-k. That is, to produce an authentication target chip that can successfully perform authentication in the image forming apparatus having an arbitrary authentication chip 106, all of the m original keys of one original key table 207 must be decrypted. However, destructive attacks, which are surprising analytical techniques for tamperproof chips, are attacks that include cutting the chip and/or chipping the chip. Thus, it is very difficult to decrypt all original keys before breaking the tamperproof chip.

Note that it is even more difficult to produce an authentication target chip that successfully performs authentication with all authentication chips 106 by analyzing the authentication key table 208 stored in the non-volatile memory 205a. For example, imagine a case where one authentication key (X3, X4, X5) has been successfully decrypted. This authentication key (X3, X4, X5) is a key that is generated by the authentication target chip 103 at S14 in the authentication with the authentication chip 106 having an authentication key table 208-X4-X5. That is, in this case, the attacker can produce only an authentication target chip that can successfully perform an authentication only in the authentication chip 106 having the authentication key table 208-X4-X5. To produce a chip that can successfully perform the authentication with all authentication chips 106, the attacker must decrypt all of n×m×z authentication keys, which is difficult in practical terms.

Note that the response data used for the authentication is generated from the challenge data that is randomly generated for each authentication. That is, replay attacks that eavesdrop communication data are invalid.

Thus, according to the present embodiment, the authentication accuracy can be increased by increasing the resistance to attacks of analyzing the authentication chip 106 and the authentication target chip 103. Note that the authentication chip 106 and the communication circuit 104; and the portion of the control device 105 related to the authentication process may be implemented as an authentication device. Likewise, the authentication target chip 103 may be implemented as an authentication target device. The authentication device authenticates the authentication target device through the authentication process described above. The authentication device may be provided in the body of any device, such as the main body of the image forming apparatus, for example. The authentication target device may be provided in any unit (a consumable, a replacement part, or an optional device) that is mounted and used in the main body of a device in which the authentication device is provided.

Note that, in the present embodiment, the original key table 207 is stored in the authentication target chip 103, and the authentication key table 208 is stored in the authentication chip 106. Alternatively, a configuration may also be adopted in which the original key table 207 is stored in the authentication chip 106 and the authentication key table 208 is stored in the authentication target chip 103. Also in this case, as in the sequence of FIG. 6, the authentication chip 106 and the authentication target chip 103 exchange the original key table ID; and the authentication key table ID and the authentication key ID. Thus, the authentication target chip 103 selects one authentication key from the n authentication keys of the authentication key table 208. Then, the authentication target chip 103 generates response data on the basis of the selected authentication key and the challenge data acquired from the authentication chip 106 and notifies the authentication chip 106 of the response data. On the other hand, the authentication chip 106 selects one original key from the m original keys of the original key table and generates the authentication key on the basis of the selected original key and the authentication key ID. Then, the authentication chip 106 generates verification data on the basis of the generated authentication key and the generated challenge data. Finally, the authentication chip 106 authenticates the authentication target chip 103 by determining whether the generated verification data and the response data received from the authentication target chip 103 match each other.

More generally, the original key table is retained in a first device and the authentication key table is retained in a second device. The first device and the second device exchange the original key table ID; and the authentication key table ID and the authentication key ID. Accordingly, the first device selects the original key and generates the authentication key on the basis of the authentication key ID, and the second device selects the authentication key. The authentication device, which is one of the first device and the second device, generates challenge data and transmits the challenge data to the authentication target device, which is the other of the first device and the second device. In addition, the authentication device generates verification data on the basis of the generated or selected authentication key and challenge data. The authentication target device generates response data on the basis of the generated or selected authentication key and challenge data and transmits the response data to the authentication device. Then, the authentication device authenticates the authentication target device by comparing the verification data with the response data.

Second Embodiment

Figure 7A:
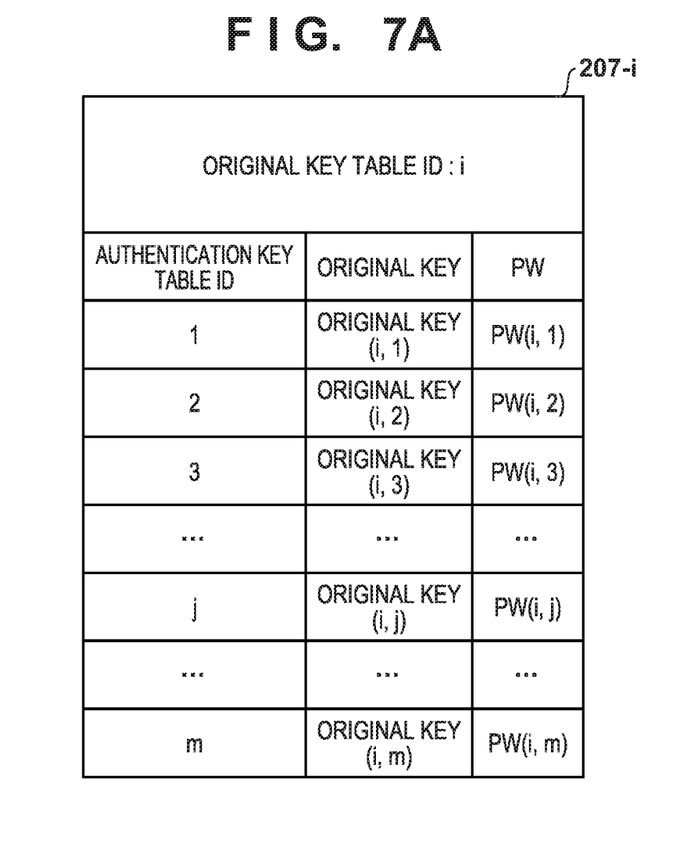
FIG. 7A is a diagram illustrating an original key table according to one embodiment.
Figure 7B:
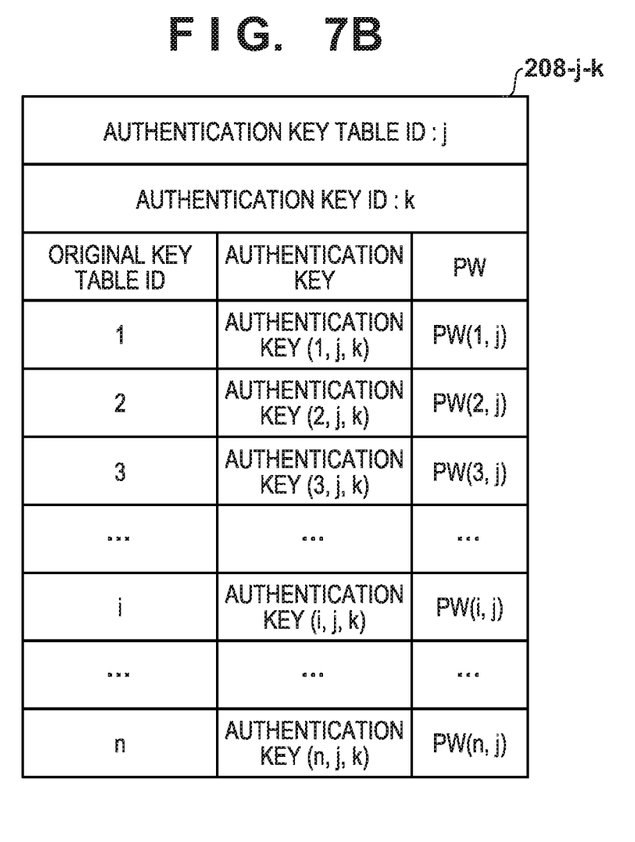
FIG. 7B illustrates an authentication key table according to one embodiment.

The following describes a second embodiment mainly about differences from the first embodiment. FIG. 7A illustrates the original key table 207-$i$ used in the present embodiment and FIG. 7B illustrates the authentication key table 208-$j$-$k$ used in the present embodiment. As illustrated in FIGS. 7A and 7B, in this embodiment, a password (PW) associated with each combination of the original key table ID and the authentication key table ID is provided. In the following, a password corresponding to a combination of the original key table ID=i and the authentication key table ID=j is referred to as a PW (i, j). That is, the PW (i, j) is a password corresponding to the original key (i, j). Each the PW (i, j) is random number data generated by the random number generator 401, for example.

Figure 8:
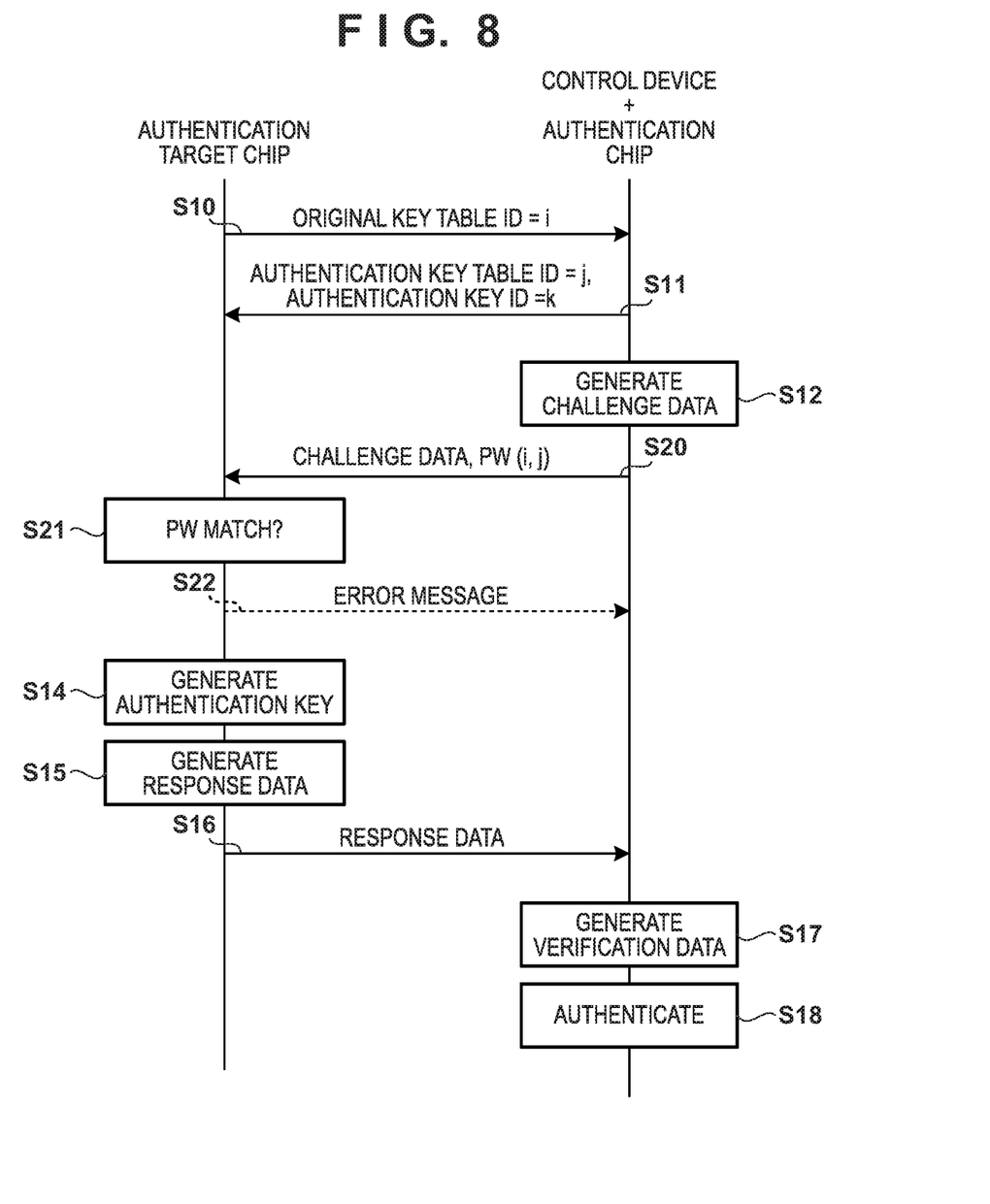
FIG. 8 illustrates a sequence of an authentication process according to one embodiment.

FIG. 8 illustrates a sequence of an authentication process according to the present embodiment. Note that, the processes similar to those of the sequence illustrated in FIG. 6 are denoted with the same step numbers and descriptions thereof will be omitted. In the present embodiment, at S20, the control device 105 transmits, to the authentication target chip 103, the PW (i, j) corresponding to the original key table ID notified at S10 in addition to the challenge data. The microcomputer 202b of the authentication target chip 103, at S21, determines whether the PW (i, j) corresponding to the authentication key table ID notified at S11 and the PW (i, j) received at S20 match each other. When the PWs do not match each other, the microcomputer 202b of the authentication target chip 103, at S22, transmits an error message to the control device 105. Upon receiving the error message, the control device 105 determines that the authentication has failed and terminates the process of FIG. 8. On the other hand, when the PWs match each other at S21, the microcomputer 202b of the authentication target chip 103 executes the processes of S14 and S15 and transmits response data to the authentication chip 106 at S16 as in the first embodiment. Upon receiving the response data as a response of S20, the authentication chip 106 executes the processes of S17 and S18 to determine whether the authentication has succeeded or failed.

Note that, in the sequence of FIG. 8, the control device 105 transmits the PW to the authentication target chip 103, and the PWs are compared in the authentication target chip 103. Alternatively, it is also possible to adopt a configuration in which the authentication target chip 103 transmits the PW corresponding to the authentication key table ID notified at S11 to the authentication chip 106 via the control device 105 and in which the authentication chip 106 compares it with the PW corresponding to the original key table ID notified at S10. In this case, when the PWs do not match each other, the control device 105 may determine that the authentication has failed and may stop the subsequent processes. The transmission of the PW from the authentication target chip 103 to the authentication chip 106 and the comparison of the PWs in the authentication chip 106 may be performed at any timing after S11. For example, when the PWs match each other as a result of an execution between S11 and S12, the authentication chip 106 may generate challenge data and transmit the data to the authentication target chip 103. On the other hand, when the PWs do not match each other, the authentication chip 106 may stop the subsequent processes without generating challenge data.

As described above, in the present embodiment, whether the PWs as verification values match each other is determined during authentication. Thus, the authentication accuracy can be further improved.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-204341, filed on Oct. 30, 2018, which is hereby incorporated by reference herein in its entirety.

What is claimed is:

1. An authentication method performed by
a first device configured to retain, among n×m original keys identified by combinations of n first identifiers (n is an integer of 2 or greater) having different values and m second identifiers (m is an integer of 2 or greater) having different values, m original keys in which values of first identifiers are a same first value, and
a second device configured to retain an authentication identifier and retain n authentication keys generated based on the authentication identifier and each of n original keys in which values of the second identifiers are a same second value among the n×m original keys,
the method comprising:
selecting, at the first device, an original key in which the first identifier has the first value and the second identifier has the second value based on the second value acquired from the second device, from the m original keys and generating, at the first device, an authentication key based on the selected original key and the authentication identifier acquired from the second device;
selecting, at the second device, an authentication key generated from the original key in which the first identifier has the first value and the second identifier has the second value based on the first value acquired from the first device, from the n authentication keys;
generating, at an authentication target device that is one of the first device and the second device, response data based on challenge data acquired from an authentication device that is the other of the first device and the second device and the authentication key generated or selected by the authentication target device, and notifying, by the authentication target device, the generated response data to the authentication device;

generating, at the authentication device, verification data based on the challenge data and the authentication key generated or selected by the authentication device; and authenticating, at the authentication device, the authentication target device by comparing the verification data with the response data.

2. The authentication method according to claim 1, wherein the first device is the authentication device and the second device is the authentication target device.

3. The authentication method according to claim 1, wherein the second device is the authentication device and the first device is the authentication target device.

4. The authentication method according to claim 1 further comprising randomly generating the challenge data by the authentication device.

5. The authentication method according to claim 1, wherein the authentication key is generated by a one-way function with the original key and the authentication identifier as input.

6. The authentication method according to claim 1, wherein the authentication key is cryptographic data based on the original key of the authentication identifier; or a cryptographic hash value of a value obtained by concatenating the authentication identifier and the original key.

7. The authentication method according to claim 1, wherein the response data and the verification data are generated by a same algorithm.

8. The authentication method according to claim 7, wherein the response data is generated by a one-way function with the challenge data and the authentication key as input.

9. The authentication method according to claim 7, wherein the response data is cryptographic data based on the authentication key of the challenge data; or a cryptographic hash value of a value obtained by concatenating the challenge data and the authentication key.

10. The authentication method according to claim 1, wherein the first device retains m verification values respectively corresponding to the m original keys, the second device retains n verification values respectively corresponding to the n original keys used to generate the n authentication keys; and the method further comprises:

determining, at the first device or the second device, whether a verification value, corresponding to the original key in which the first identifier has the first value and the second identifier has the second value among the m verification values retained in the first device, and a verification value, corresponding to the original key in which the first identifier has the first value and the second identifier has the second value among the n verification values retained in the second device, match each other.

11. An authentication device configured to authenticate an authentication target device configured to retain, among n×m original keys identified by combinations of n first identifiers (n is an integer of 2 or greater) having different values and m second identifiers (m is an integer of 2 or greater) having different values, m original keys in which values of first identifiers are a same first value, the authentication device comprising:

a storage unit configured to store an authentication identifier and store n authentication keys generated based on the authentication identifier and each of n original keys in which values of the second identifiers are a same second value among the n×m original keys;

a notification unit configured to notify, to the authentication target device, the authentication identifier, the second value, and challenge data;

a selection unit configured to acquire the first value from the authentication target device and to select an authentication key generated from an original key in which the first identifier has the first value and the second identifier has the second value, from the n authentication keys;

a generating unit configured to generate verification data based on the authentication key selected by the selecting unit and the challenge data; and an authentication unit configured to authenticate the authentication target device by comparing the verification data with response data acquired from the authentication target device as a response to the challenge data notified to the authentication target device.

12. The authentication device according to claim 11, wherein the response data is data generated based on the challenge data and the authentication key that is generated based on the authentication identifier and the original key in which the first identifier has the first value and the second identifier has the second value among the m original keys retained in the authentication target device.

13. The authentication device according to claim 11, wherein the storage unit stores n verification values respectively corresponding to the n original keys used to generate the n authentication keys, and the authentication device further comprises:

a determination unit configured to determine whether a verification value, corresponding to the original key in which the first identifier has the first value and the second identifier has the second value among the n verification values, and a verification value, acquired from the authentication target device as a response to the second value notified to the authentication target device, match each other.

14. The authentication device according to claim 13, wherein the response data is data generated based on the challenge data and an authentication key generated from the original key in which the first identifier has the first value and the second identifier has the second value among the n authentication keys retained in the authentication target device.

15. The authentication device according to claim 11 further comprising a unit configured to randomly generate the challenge data.

16. The authentication device according to claim 11, wherein the authentication key is generated by a one-way function with the original key and the authentication identifier as input.

17. The authentication device according to claim 11, wherein the authentication key is cryptographic data based on the original key of the authentication identifier; or a cryptographic hash value of a value obtained by concatenating the authentication identifier and the original key.

18. The authentication device according to claim 17, wherein the response data is generated by a one-way function with the challenge data and the authentication key as input.

19. The authentication device according to claim 11, wherein the response data and the verification data are generated by a same algorithm.

20. The authentication device according to claim 19, wherein the response data is cryptographic data based on the authentication key of the challenge data; or a cryptographic hash value of a value obtained by concatenating the challenge data and the authentication key.

21. An authentication device configured to authenticate an authentication target device configured to retain an authentication identifier and retain n authentication keys (n is an integer of 2 or greater) generated based on the authentication identifier and each of n original keys in which values of second identifiers are a same second value among n×m original keys identified by combinations of n first identifiers having different values and m second identifiers (m is an integer of 2 or greater) having different values, the authentication device comprising:
a storage unit configured to store m original keys in which values of first identifiers are a same first value among the n×m original keys;
a notification unit configured to notify, to the authentication target device, the first value and challenge data;
a selection unit configured to acquire the second value from the authentication target device and to select an original key in which the first identifier has the first value and the second identifier has the second value;
a first generating unit configured to generate an authentication key based on the original key selected by the selection unit and the authentication identifier acquired from the authentication target device;
a second generating unit configured to generate verification data based on the authentication key generated by the first generating unit and the challenge data; and
an authentication unit configured to authenticate the authentication target device by comparing the verification data with response data acquired from the authentication target device as a response to the challenge data notified to the authentication target device.

22. The authentication device according to claim 21, wherein
the storage unit stores m verification values respectively corresponding to the m original keys, and
the authentication device further comprises:
a determination unit configured to determine whether a verification value, corresponding to the original key in which the first identifier has the first value and the second identifier has the second value among the m verification values, and a verification value, acquired from the authentication target device as a response to the first value notified to the authentication target device, match each other.

23. An image forming apparatus including an authentication device configured to authenticate an authentication target device configured to retain, among n×m original keys identified by combinations of n first identifiers (n is an integer of 2 or greater) having different values and m second identifiers (m is an integer of 2 or greater) having different values, m original keys in which values of first identifiers are a same first value, the image forming apparatus comprising:
a storage unit configured to store an authentication identifier and store n authentication keys generated based on the authentication identifier and each of n original keys in which values of the second identifiers are a same second value among the n×m original keys;
a notification unit configured to notify, to the authentication target device, the authentication identifier, the second value, and challenge data;
a selection unit configured to acquire the first value from the authentication target device and to select an authentication key generated from an original key in which the first identifier has the first value and the second identifier has the second value, from the n authentication keys;
a generating unit configured to generate verification data based on the authentication key selected by the selecting unit and the challenge data; and
an authentication unit configured to authenticate the authentication target device by comparing the verification data with response data acquired from the authentication target device as a response to the challenge data notified to the authentication target device.

24. The image forming apparatus according to claim 23, wherein the authentication target device is a unit that is detachable from the image forming apparatus, and
the unit includes a member used to form an image.

25. The image forming apparatus according to claim 24, wherein the member includes a photosensitive member.

26. An image forming apparatus including an authentication device configured to authenticate an authentication target device configured to retain an authentication identifier and retain n authentication keys (n is an integer of 2 or greater) generated based on the authentication identifier and each of n original keys in which values of second identifiers are a same second value among n×m original keys identified by combinations of n first identifiers having different values and m second identifiers (m is an integer of 2 or greater) having different values, the image forming apparatus comprising:
a storage unit configured to store m original keys in which values of the first identifiers are a same first value among the n×m original keys;
a notification unit configured to notify, to the authentication target device, the first value and challenge data;
a selection unit configured to acquire the second value from the authentication target device and to select an original key in which the first identifier has the first value and the second identifier has the second value;
a first generating unit configured to generate an authentication key based on the original key selected by the selection unit and the authentication identifier acquired from the authentication target device;
a second generating unit configured to generate verification data based on the authentication key generated by the first generating unit and the challenge data; and
an authentication unit configured to authenticate the authentication target device by comparing the verification data with response data acquired from the authentication target device as a response to the challenge data notified to the authentication target device.

27. An authentication target device configured to be authenticated by an authentication device configured to retain an authentication identifier and retain n (n is an integer of 2 or greater) authentication keys generated based on the authentication identifier and each of n original keys in which values of second identifiers are a same second value among n×m original keys identified by combinations of first identifiers having different values and m second identifiers having different values, the authentication target device comprising:
a storage unit configured to store m original keys in which values of the first identifiers are a same first value among the n×m original keys;
a selection unit configured to acquire the second value from the authentication device and to select an original key in which the first identifier has the first value and the second identifier has the second value;

a first generating unit configured to generate an authentication key based on the original key selected by the selection unit and the authentication identifier acquired from the authentication device;

a second generating unit configured to generate response data based on the authentication key generated by the first generating unit and challenge data acquired from the authentication device; and a notification unit configured to notify, to the authentication device, the first value and the response data.

28. The authentication target device according to claim 27, wherein the storage unit stores m verification values respectively corresponding to the m original keys, and the authentication target device further comprises:

a determination unit configured to determine whether a verification value, corresponding to the original key in which the first identifier has the first value and the second identifier has the second value among the m verification values, and a verification value, acquired from the authentication device as a response to the first value notified to the authentication device, match each other.

29. An authentication target device configured to be authenticated by an authentication device configured to retain, among n×m original keys identified by combinations of n first identifiers (n is an integer of 2 or greater) having different values and m second identifiers (m is an integer of 2 or greater) having different values, m original keys in which values of first identifiers are a same first value, the authentication target device comprising:

a storage unit configured to store an authentication identifier and store n authentication keys generated based on the authentication identifier and each of n original keys in which values of the second identifiers are a same second value among the n×m original keys;

a selection unit configured to acquire the first value from the authentication device and to select an authentication key generated from an original key in which the first identifier has the first value and the second identifier has the second value, from the n authentication keys;

a generating unit configured to generate response data based on the authentication key selected by the selecting unit and challenge data acquired from the authentication device; and a notification unit configured to notify, to the authentication device, the authentication identifier, the second value, and response data.

30. The authentication target device according to claim 29, wherein the storage unit stores n verification values respectively corresponding to the n original keys used to generate the n authentication keys, and the authentication target device further comprises:

a determination unit configured to determine whether a verification value, corresponding to the original key in which the first identifier has the first value and the second identifier has the second value among the n verification values, and a verification value, acquired from the authentication device as a response to the second value notified to the authentication device, match each other.

31. The authentication target device according to claim 27, wherein the authentication target device is a unit that is detachable from an image forming apparatus, and the unit includes a member used to form an image.

32. The authentication target device according to claim 31, wherein the member includes a photosensitive member.

33. The authentication target device according to claim 29, wherein the authentication target device is a unit that is detachable from an image forming apparatus, and the unit includes a member used to form an image.

34. The authentication target device according to claim 33, wherein the member includes a photosensitive member.

* * * * *